United States Patent
Prigent et al.

[11] Patent Number: 5,386,696
[45] Date of Patent: Feb. 7, 1995

[54] EXHAUST MANIFOLD WITH CATALYTIC WALL FOR INTERNAL-COMBUSTION ENGINES

[75] Inventors: Michel Prigent; Daniel Durand, both of Rueil Malmaison; Jean Favennec, Elancourt, all of France

[73] Assignee: Institut Francais Du Petrole, Rueil Malmaison, France

[21] Appl. No.: 18,151

[22] Filed: Feb. 16, 1993

[30] Foreign Application Priority Data

Feb. 14, 1992 [FR] France .................... 92 01801

[51] Int. Cl.$^6$ ................................. F01N 3/28
[52] U.S. Cl. .................... 60/300; 422/174; 422/180
[58] Field of Search ............ 60/299, 300; 422/179, 422/180, 174

[56] References Cited

U.S. PATENT DOCUMENTS

| | | |
|---|---|---|
| 3,642,094 | 2/1972 | Yancey .................... 60/299 |
| 3,683,625 | 8/1972 | McCrink .................. 60/276 |
| 4,022,019 | 5/1977 | Garcea .................... 60/282 |
| 4,186,172 | 1/1980 | Scholz ..................... 60/299 |
| 4,220,625 | 9/1980 | Toh ........................ 422/180 |
| 5,070,694 | 12/1991 | Whittenberger ........... 60/300 |

FOREIGN PATENT DOCUMENTS

| | | | |
|---|---|---|---|
| 32223 | 3/1978 | Japan ..................... 60/299 |
| 2037369 | 7/1980 | United Kingdom ......... 60/299 |

Primary Examiner—Douglas Hart
Attorney, Agent, or Firm—Antonelli, Terry, Stout & Kraus

[57] ABSTRACT

Exhaust manifold for catalytic treatment of the exhaust gases of an internal-combustion engine comprising a metallic outer tube (1) including a catalyst layer (4) in direct contact with the exhaust gases. According to the invention, the manifold also comprises at least one inner tubular element (2), substantially coaxial to said outer tube (1) and providing with the latter at least one space (3), the inner surface of said inner tube (2) being coated by said catalyst layer (4).

10 Claims, 1 Drawing Sheet

EXHAUST MANIFOLD WITH CATALYTIC WALL FOR INTERNAL-COMBUSTION ENGINES

FIELD OF THE INVENTION

The present invention relates to the exhaust lines of automotive vehicles crossed by the waste gases discharged by internal-combustion engines.

More precisely, the invention relates to mufflers known as "catalytic" mufflers because they include a catalytic substance (a catalyst) intended to reduce the pollutants, such as CO, HC, $NO_x$, contained in exhaust gases.

BACKGROUND OF THE INVENTION

Since standards relative to air pollution become more and more severe in most industrialized countries, car manufacturers carry out extensive research, in various ways, in order to improve the efficiency of catalytic mufflers.

One major problem posed by catalytic mufflers relates to cold starting: when the temperature of the exhaust gases does not reach a given threshold value, the catalytic muffler actually has no effect on the pollutants contained in the exhaust gases. The starting period of a catalytic muffler is the time during which it has no or very little effect on pollutants. This period may usually last for several minutes.

Several solutions have been proposed to reduce the starting period of catalysts.

It is for example well-known, through patent applications EP-0,177,479; U.S. Pat. No. 4,376,374; EP-0,340,946 . . . , to carefully insulate the catalyst and/or the exhaust manifold in order to limit heat losses and therefore to allow the catalyst to heat up more rapidly. Overheating of the catalysts, when started, may be a drawback of such systems.

Another solution consists of creating different flows for the exhaust gases, according to their temperature. Patent FR-2,608,678 and document DE-3,406,968 disclose solutions of this type which, however, cannot always be easily implemented.

Another way of improving the efficiency of a catalytic muffler on the cold starting of the vehicle consists of bringing the muffler closer to the engine. But this is not always possible because of the size of the muffler and of the space available in the vehicle. One therefore often has to use several mufflers in series: a first muffler of limited size which is placed as close as possible to the engine, followed by a second muffler of larger size placed further from the engine. The first muffler, which is used to speed up depollution upon starting, is commonly called "light-off muffler".

Multicylinder engines having tuned exhaust manifolds, designed to improve the filling of the engine and its power according to the pressure waves in the exhaust at the various engine speeds, may have several "light-off mufflers", each being arranged in the exhaust manifold of a cylinder or of a given group of cylinders.

With two-stroke engines, the power of the engine is substantially linked to the geometry of the exhaust line upstream from the gas expansion vessel, so that the presence of a light-off catalyst, even of small size, may considerably harm the running of the engine through disturbances of the pressure waves in the exhaust.

This is the reason why no conventional light-off catalysts can be used in exhaust lines of two-stroke engines.

On the other hand, it has been proposed to replace light-off mufflers by a catalytic coating applied directly on the inner walls of exhaust manifolds. Document SAE-790,306, published in March 1979, and entitled "Catalyst systems with an emphasis on three-way conversion and novel concepts", contemplates such a coating. According to this publication, the catalyst is applied either directly on the inner wall of the exhaust tube, or on metallic crossbraces welded onto the inner wall of the exhaust tube.

Although this type of catalyst is advantageous as far as pressure waves are concerned, the problem of the heating period of the catalyst remains since the wall of the tube, cooled by the outer air, takes a long time to heat up.

SUMMARY OF THE INVENTION

The above mentioned drawbacks may be simultaneously overcome by means of an exhaust manifold or pipe according to the present invention.

An exhaust manifold may comprise, as it is well-known, a metallic outer tube including a catalyst layer directly in contact with the exhaust gases.

According to the invention, the exhaust manifold may also comprise at least one inner tubular element, substantially coaxial to said outer tube and providing with the latter at least one space, the inner surface of said inner tube being coated by said catalyst layer.

According to one embodiment of the invention, the exhaust manifold may comprise a single inner tube of corrugated profile.

The space contained between the outer tube and the inner tubular element may be preferably filled with an insulating element, and the thickness of said outer tube may range from 0.5 to 1.5 mm.

The thickness of the inner tubular element may advantageously range from 0.2 to 0.8 mm.

Besides, the outer tube may be made from chromium steel, and the inner tubular element may be made from chromium and aluminum steel, or from surface-aluminized stainless steel.

Preferably, the noble metals used to form said catalytic layer may be platinum, palladium and/or rhodium, said metals being deposited in finely divided form on oxides of large specific surface.

Moreover, the manifold according to the invention may comprise means allowing circulation of an electric current in order to preheat the inner tubular element.

BRIEF DESCRIPTION OF THE DRAWINGS

Other features and advantages of the present invention will be clear from reading the description hereafter, given by way of non limitative example, with reference to the accompanying drawings in which.

DESCRIPTION OF THE PREFERRED EMBODIMENTS

Figure 1:
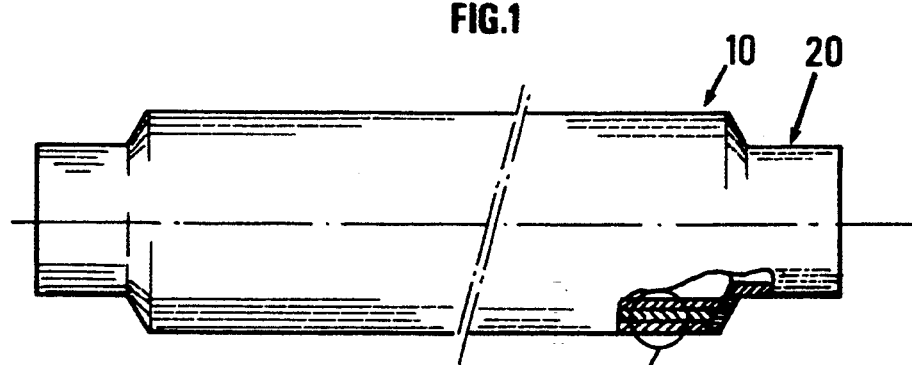
FIG. 1 is a longitudinal section of a known exhaust manifold.

FIG. 1 is a longitudinal section of a manifold 10.

The section of this manifold 10 is preferably, for manufacturing conveniences, enlarged with respect to a simple manifold 20, although this feature is in no way compulsory.

In comparison with a monolithic catalytic muffler, for example honeycombed, the muffler according to the invention exhibits very limited dimensions.

Manifold 10 is connected by any means known in the art to the conventional exhaust manifold 20.

Figure 2:
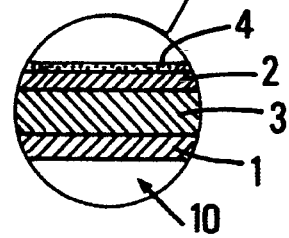
FIG. 2 is a cross-section showing in a detailed way the structure of the manifold of FIG. 1.

FIG. 2 shows in a more detailed way the structure of manifold 10.

This manifold preferably consists of an outer tube 1 and of an inner tube or tubular element 2 coaxial to outer tube 1. A layer 4 called catalytic layer is inwardly deposited on the inner tube 2.

The dimensions of the outer tube 1 and of the inner tube 2 are such that a substantially annular space 3 is provided between them, and said space may be filled or not with a thermal and/or electric insulating element.

Figure 3:
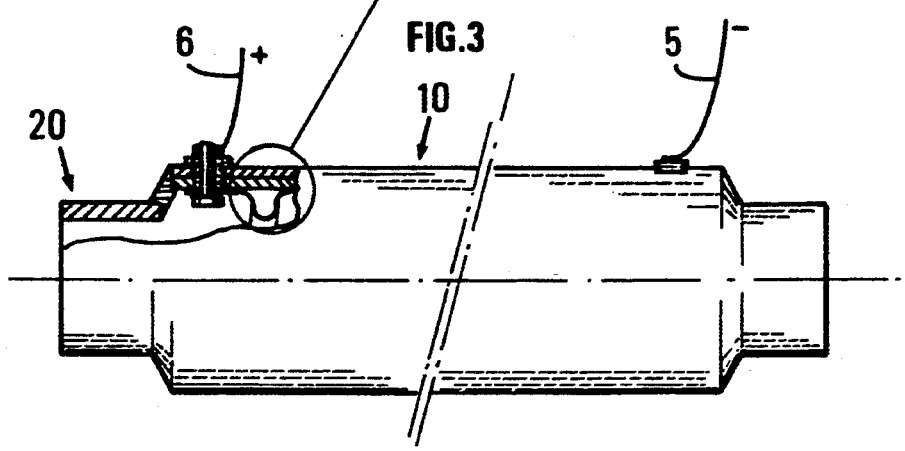
FIG. 3 is a longitudinal section of one embodiment of the invention.

FIG. 3 is a longitudinal section of one embodiment of the invention which is different from that described above in the shape of the inner metallic tube 2.

The thickness of the outer wall 1 preferably ranges from 0.5 mm to 1.5 mm and may be made, by any means known in the art, from chromium steel.

The thickness of the inner wall 2 preferably ranges from 0.2 mm to 0.8 mm and may be made from chromium and aluminum steel, such as the Gilphal 135 steel manufactured by the Imphy company, the Fecralloy steel marketed by the Sandwik company or the Aluchrom steel marketed by the VDM company, or else the Alsichrom steel marketed by the Thyssen company.

The inner wall may also be made from a steel coated with an aluminum layer and which has been subjected to a diffusion treatment in order to obtain a heat-resisting alloy.

More generally, alloys of the FeMCr+Al type, stabilized by rare earths, are used, the element M being commonly an element of the transition class and nickel will be more particularly selected.

The average thickness of the space 3 delimited between above defined tubes 1 and 2 may range from 0.5 mm to 3 mm. The insulating substance possibly present in this space 3 may consist of ceramic fibers for example.

The inner face of the inner manifold 2 is preferably treated in the following way, so as to allow noble metals to be deposited thereon: a layer of an oxide or of a mixture of oxides of large surface is applied, by a technique well-known by the man skilled in the art, for example in the form of a slip, on the inner face of manifold 2.

Large surface oxides may be selected from simple or mixed oxides based on aluminum, such as $Al_2O_3$, $Al_2O_3$—$BaO$, $Al_2O_3$—$CeO_2$, $Al_2O_3$—$CeO_2$—$La_2O_3$, based on silicium, magnesium, zirconium, titanium, cerium, iron, manganese, etc.

It is generally necessary to previously carry out a high-temperature oxidation treatment of the inner tube 2. This treatment is intended to form an alumina bonding underlayer from the aluminum contained in the metal.

Besides, a thermal treatment is necessary after applying the slip so as to give the oxide layer sufficient mechanical strength.

After this last thermal treatment, it is possible to form the catalytic layer 4, that is to deposit noble metals, such as platinum, palladium and/or rhodium, in a very dispersed way, on the oxide layer of large surface.

This operation is performed through techniques well-known by the man skilled in the art, for example by impregnation of an aqueous solution of the metal salts cited above, followed by a thermal treatment intended to decompose the salts.

The nature and the amount of the noble metals deposited depend on the application concerned. For platinum for example, the amount may range from 1 to 10 milligrams per $m^2$ of surface covered.

Without departing from the scope of the invention, platinum may be replaced by palladium used at the same concentrations or associated with platinum in a mass ratio of 0.1 to 10. Rhodium may also be associated with platinum and/or palladium, in a mass ratio of 0.01 to 1.

The thickness of the catalytic layer 4 commonly ranges from 1 to 50 microns.

According to the embodiment shown in FIG. 3, the inner manifold 2 consists of a flexible metal tube of corrugated profile.

Figure 4:
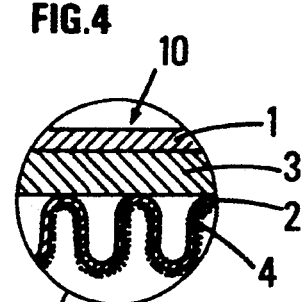
FIG. 4 is a cross-section showing in a detailed way the structure of the manifold according to said embodiment of the invention.

FIG. 4 shows this lay-out in a more detailed way. The insulator may be cylindrical, as shown in FIG. 4, but it may also fill space 3 more completely if a powdery product, a powder or any other insulating substance which may be introduced into space 3 is used.

The corrugated inner tube may be, for example, a flexible hose registered under the trade name BX BOA and manufactured by the French company A.C.C. La Jonchére. This type of hose consists of profiled bands wound helically and welded along their length.

These hoses may also be obtained from a rolled strip welded edge to edge longitudinally, the parallel corrugations being obtained mechanically.

The corrugated inner tube 2 may be placed in the outer tube 1 after bending of the latter, and be already coated with the catalytic layer 4 on its inner face.

One advantage provided by the supple corrugated inner tube is that it can be easily mounted, notably inside bent tubes. This advantage is widely appreciated because the exhaust manifold generally has numerous bends and other orientation changes over its length. Thus, this represents a simplification in the manufacturing of such a manifold.

Moreover, in a mounting with a straight inner tube, it is difficult to maintain a constant space between the two coaxial tubes: in fact, different thermal expansions may appear in zones of the manifold which are heated (or cooled) differently. Therefore, in certain zones, the two straight tubes may go out of shape and come in contact with one another, which may be harmful to the later running of the manifold.

According to the present invention, the corrugation of the inner tube defines, from the start, precise contact points, preferably evenly spaced out so that a constant average spacing is created.

Finally, a straight inner tube requires a larger thickness in order to be stiffened. To obtain such stiffness, the corrugated tube according to the invention may be relatively thin since each contact zone is also a bearing surface providing directly stiffness to the whole.

The two concentric tubes (1 and 2) are either brought together at their ends only, or welded at several points, at the level of the various contact zones.

Besides, as may be seen in FIG. 3, means 5, 6 allowing circulation of an electric current from one end to the other of the inner metallic tube 2 may be fastened to the manifold 10 according to the invention. Thus, the intermediate layer 3 allows outer tube 1 to be electrically insulated. Any device known in the art, allowing notably outer tube 1 to be electrically insulated with respect to fastening means 5, has to be provided.

Thus, preheating of inner tube 2 may be achieved by an electric current, before starting the engine (battery feed). This preheating may be maintained, if necessary, for some time after the starting up, until a minimum temperature is reached in the catalytic layer 4.

Of course, other modifications and/or additions may be brought by the man skilled in the art to the description above, given by way of non limitative example, without departing from the scope of the present invention.

We claim:

1. An exhaust pipe for the catalytic treatment of exhaust gases of an internal-combustion engine, which comprises a catalytic layer in direct contact with the exhaust gases; a metallic outer tube; and at least one inner tube arranged substantially coaxial to said outer tube and defining at least one space with the outer tube; an inner surface of said inner tube being coated with said catalytic layer and said inner tube having a corrugated profile defining parallel corrugations arranged transversely to a longitudinal axis of the inner tube and forming said inner surface; the space between the inner tube and the outer tube being an annular space containing a cylindrically shaped insulating element which insulates the inner tube thermally and electrically from said outer tube; and means for passing electrical current through the inner tube in order to provide preheating of the inner tube and the catalytic layer.

2. An exhaust pipe according to claim 1, wherein the thickness of said outer tube ranges from 0.5 to 1.5 mm.

3. An exhaust pipe according to claim 2, wherein the thickness of the inner tube ranges from 0.2 to 0.8 mm.

4. An exhaust pipe according to claim 1, wherein the thickness of said insulating element ranges from 0.5 to 3 mm.

5. An exhaust pipe as claimed in claim 3, wherein the thickness of said insulating element ranges from 0.5 to 3 mm.

6. An exhaust pipe according to claim 1, wherein said outer tube is made from a chromium steel.

7. An exhaust pipe according to claim 1, wherein the inner tube is made from a chromium and aluminum steel, or from a chromium, nickel and aluminum steel or from a surface-aluminized stainless steel.

8. An exhaust pipe according to claim 1, wherein said catalytic layer contains noble metals, said noble metals comprising platinum, palladium and/or rhodium.

9. An exhaust pipe for the catalytic treatment of exhaust gases of an internal-combustion engine, which comprises a catalytic layer in direct contact with the exhaust gases; a metallic outer tube; at least one inner tube arranged substantially coaxial to said outer tube and defining at least one space with the outer tube; an inner surface of said inner tube being coated with said catalytic layer and said inner tube having a corrugated profile defining parallel corrugations arranged transversely to a longitudinal axis of the inner tube and forming said inner surface; the space between the inner tube and the outer tube being an annular space containing a cylindrically shaped insulating element which insulates the inner tube thermally and electrically from said outer tube, the thickness of said insulating element ranging from 0.5 to 3 mm; and means for passing electrical current through the inner tube in order to provide preheating of the inner tube and the catalytic layer.

10. An exhaust pipe according to claim 1, wherein said inner tube is a flexible member adapted to conform to bends in said outer tube.

* * * * *